(No Model.) 6 Sheets—Sheet 1.

C. B. HOPKINS.
CASH REGISTER AND INDICATOR.

No. 347,296. Patented Aug. 10, 1886.

Witnesses:
Jas. E. Hutchinson.
Henry C. Hazard.

Inventor.
Caleb B. Hopkins
by Pringle and Russell
his Attorneys

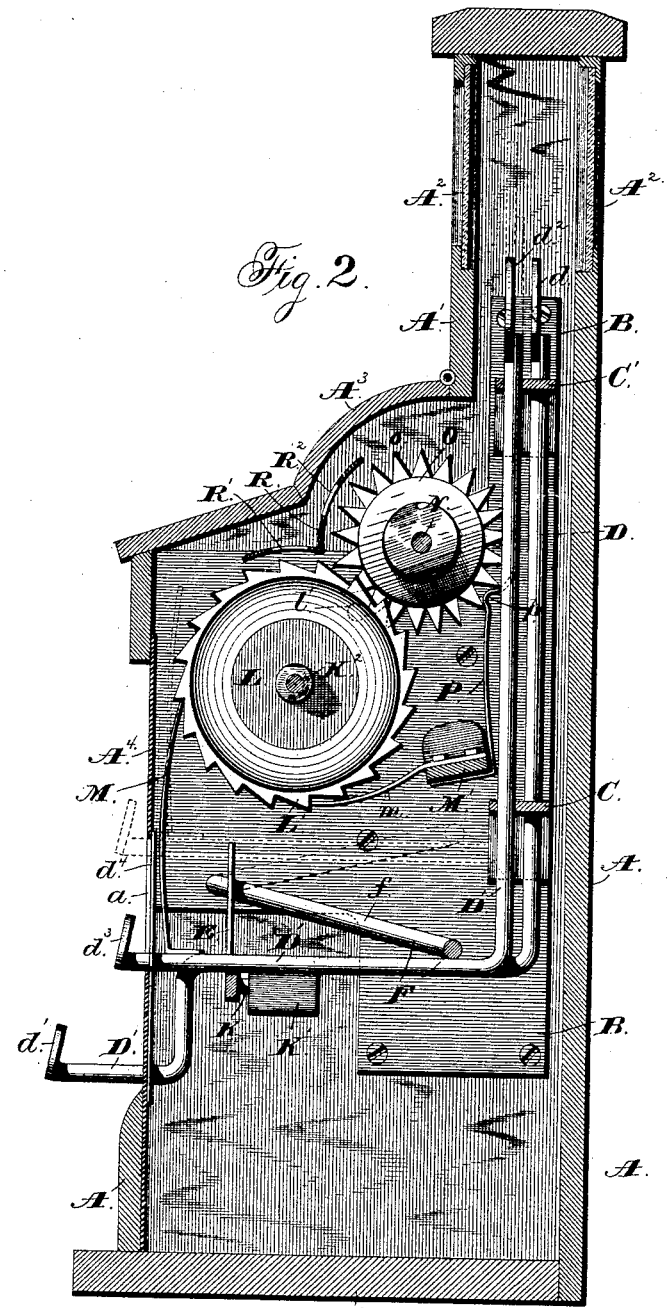

(No Model.)

C. B. HOPKINS.
CASH REGISTER AND INDICATOR.

No. 347,296.  Patented Aug. 10, 1886.

6 Sheets—Sheet 3.

Witnesses:
Jas. E. Hutchinson.
Henry C. Hazard.

Inventor.
Cabel B. Hopkins
by Prindle & Russell
his attorneys (No Model.)  6 Sheets—Sheet 4.

C. B. HOPKINS.
CASH REGISTER AND INDICATOR.

No. 347,296.  Patented Aug. 10, 1886.

Witnesses:
Jas. E. Hutchinson
Henry C. Hazard

Inventor.
Cabel B. Hopkins
by Prindle and Russell
his attorneys (No Model.)  
6 Sheets—Sheet 5.

C. B. HOPKINS.
CASH REGISTER AND INDICATOR.

No. 347,296. Patented Aug. 10, 1886.

Witnesses:
Jas. E. Hutchinson.
Henry C. Hazard.

Inventor.
Cabel B. Hopkins
by Prindle and Russell
his attorneys (No Model.)  6 Sheets—Sheet 6.
C. B. HOPKINS.
CASH REGISTER AND INDICATOR.
No. 347,296.   Patented Aug. 10, 1886.
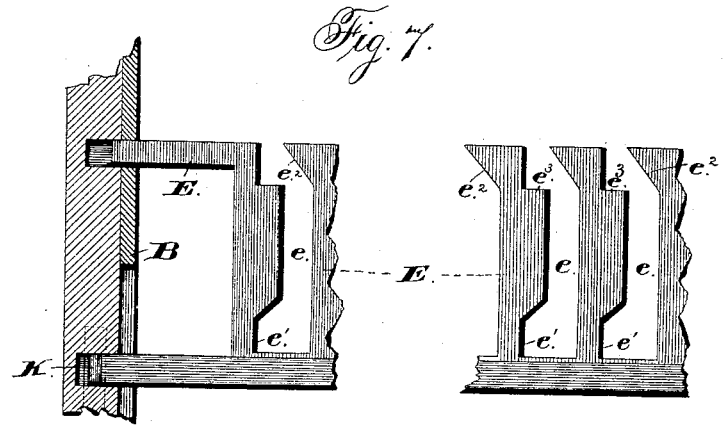
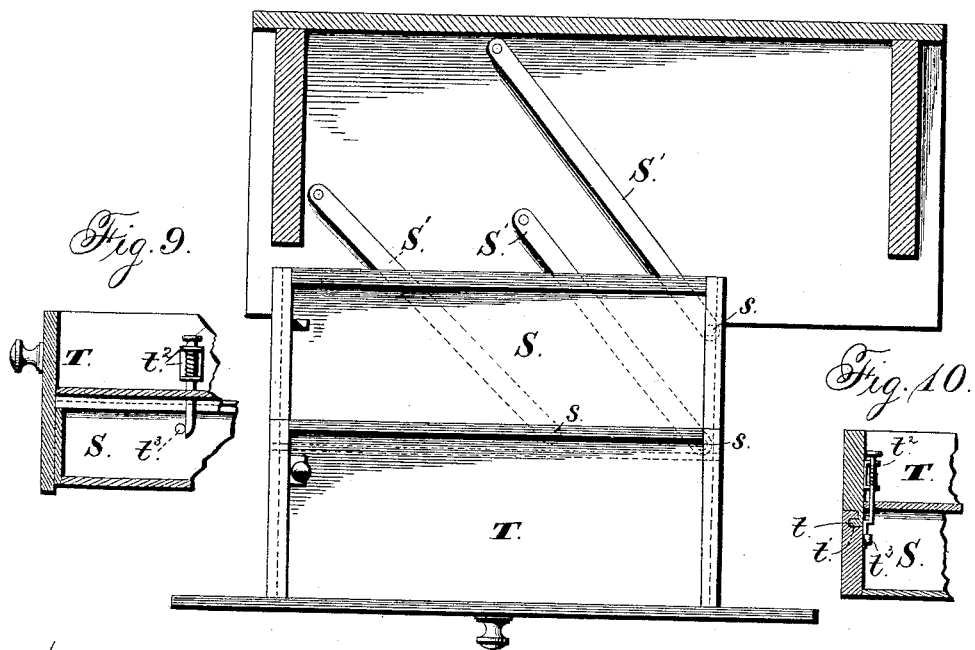

UNITED STATES PATENT OFFICE.

CABEL B. HOPKINS, OF LOUISVILLE, KENTUCKY, ASSIGNOR TO HIMSELF AND O. E. ROBINSON, OF SAME PLACE.

CASH REGISTER AND INDICATOR.

SPECIFICATION forming part of Letters Patent No. 347,296, dated August 10, 1886.

Application filed March 20, 1886. Serial No. 195,880. (No model.)

*To all whom it may concern:*

Figure 1:
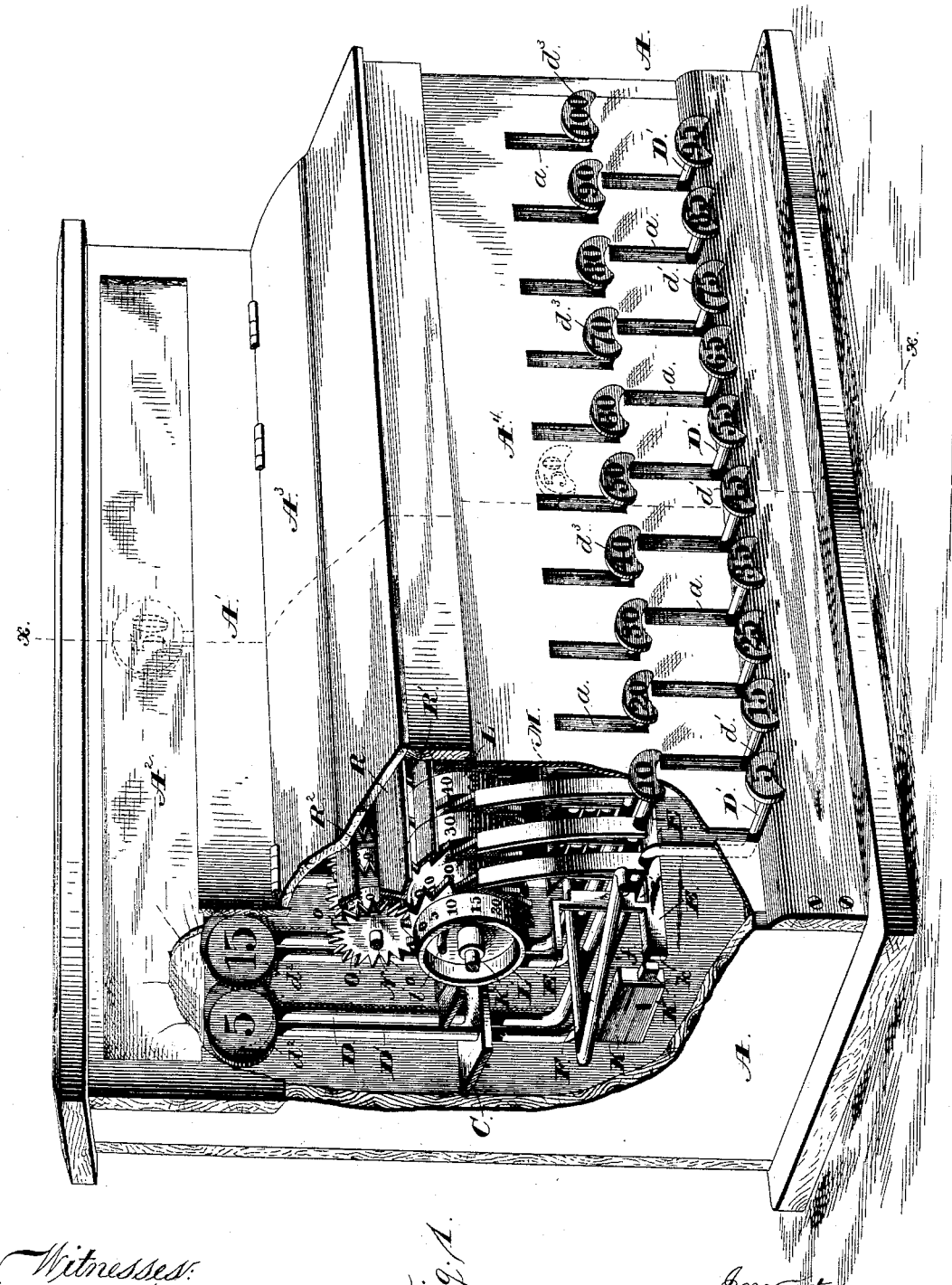
Figure 5:
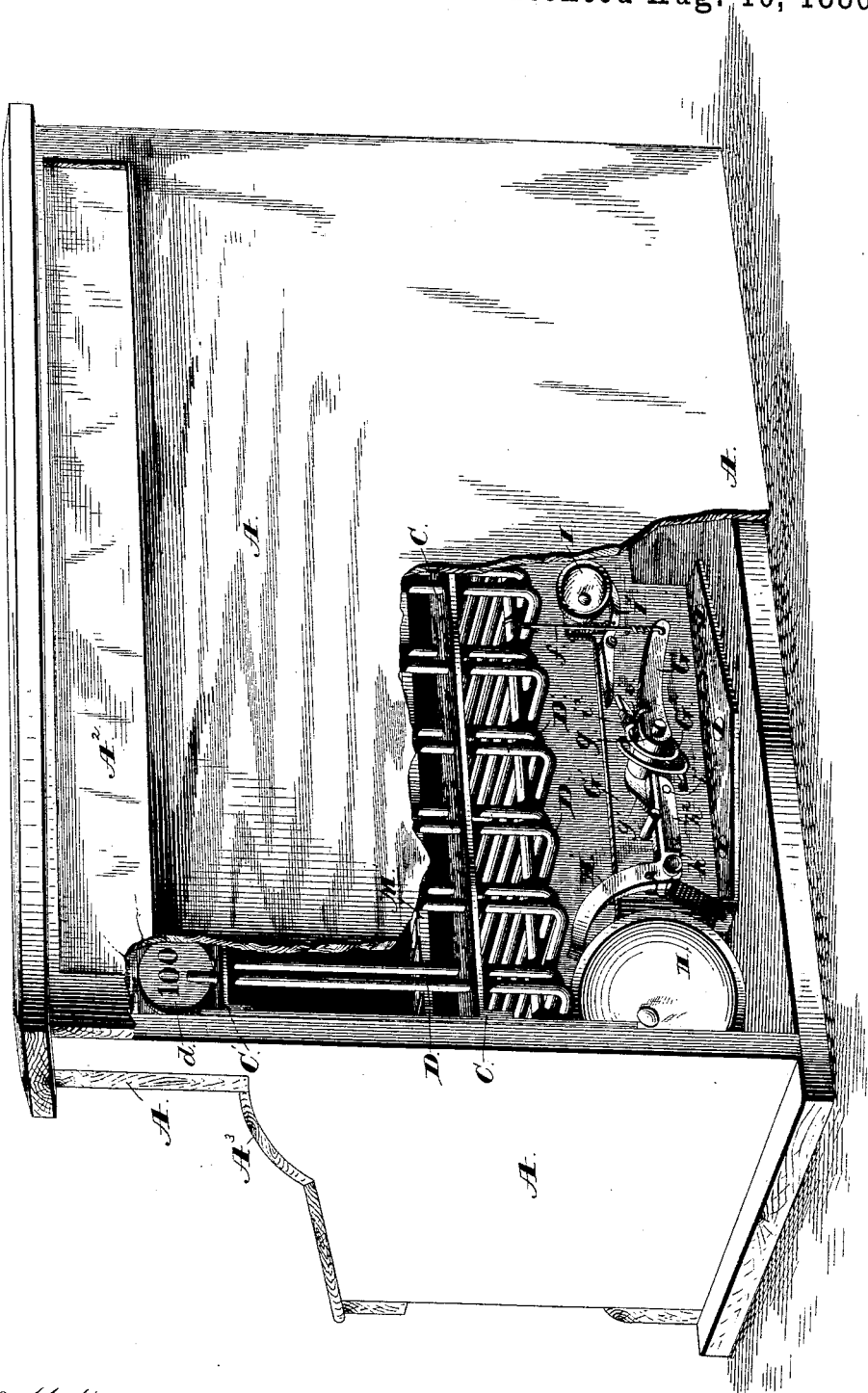
Figure 4:
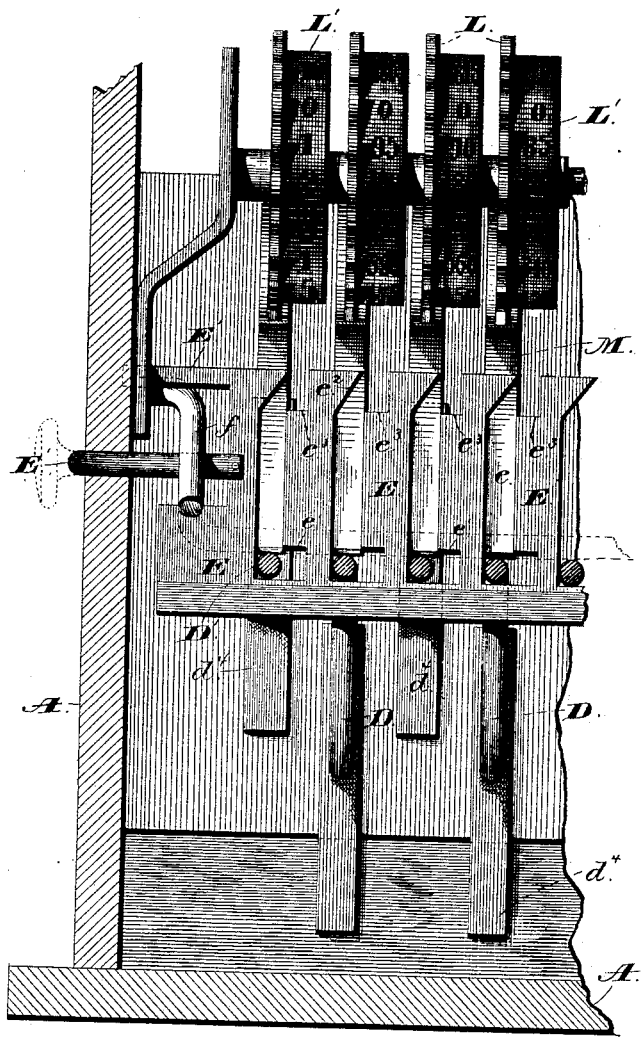
Figure 5:
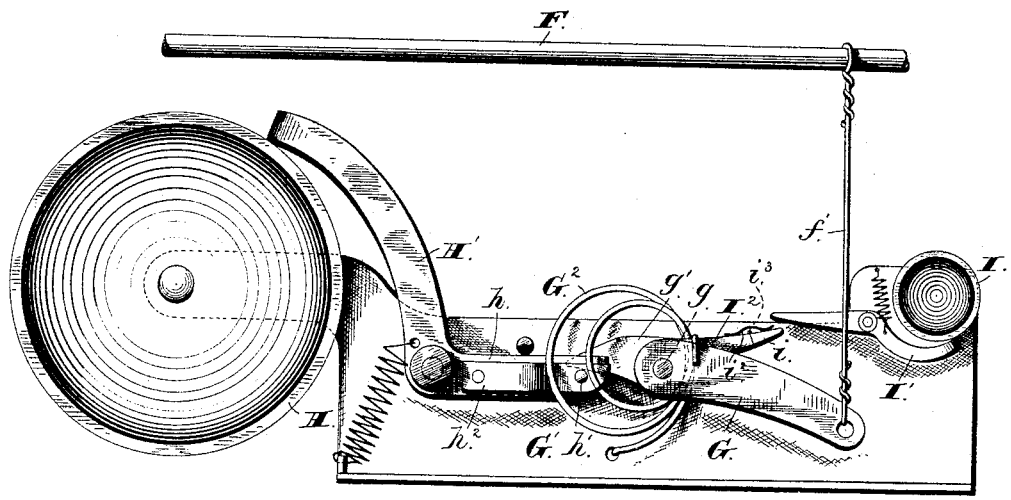
Figure 6:
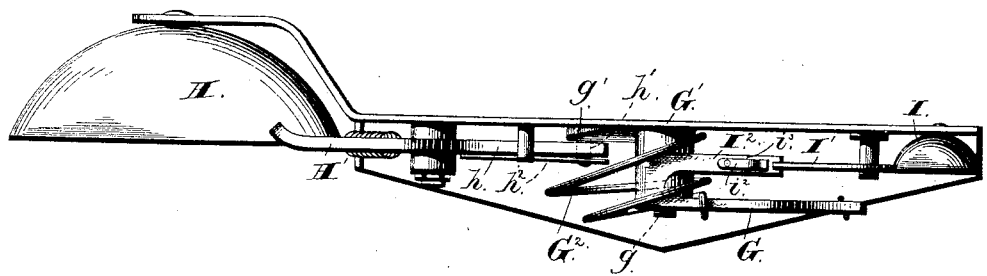

Be it known that I, CABEL B. HOPKINS, of Louisville, in the county of Jefferson and State of Kentucky, have invented certain new and useful Improvements in Cash Registers and Indicators; and I do hereby declare that the following is a full, clear, and exact description thereof, reference being had to the accompanying drawings, in which—
Figure 1 shows a front perspective view of my apparatus, with a portion of the casing broken away to show the mechanism within; Fig. 2, a vertical section of the same on line $x$ $x$ of Fig. 1; Fig. 3, a rear perspective view of the apparatus, with a portion of the casing broken away; Fig. 4, a detail view of a portion of the operative mechanism of my apparatus, looking from the rear; Fig. 5, a detail view of the alarm mechanism in rear elevation; Fig. 6, a detail plan view of the same; Fig. 7, a detail view showing a modification of the locking or pawl bar; Fig. 8, a detail view of the cash-drawers; and Figs. 9 and 10, detail views showing portions of such drawers.
Letters of like name and kind refer to like parts in each of the figures.

The object of my invention is to provide an improved cash register and indicator; and to this end my invention consists in the apparatus and in the construction, arrangement, and combination of its parts, as hereinafter specified.

In the drawings, A designates the casing of my apparatus, having the raised upright portion A' on its top, which portion is both in its front and in its rear side provided with a long opening closed with the strip of glass A². These glass-closed openings extend nearly throughout the length of the upright portion A', so as to allow for the display of a series of figured or numbered tablets or plates, as hereinafter described. To the lower edge of this upright raised portion the top A³ of the main portion of the casing is hinged. Such top or cover I preferably make inclined downward and forward, as shown, and with its rear or upper portion rounded or arched; but I do not limit myself to such form or construction thereof. A lock of any desired form or kind is to be provided for locking this lid or cover shut. The main portion of the front of the casing is preferably, as indicated in the drawings, formed of a metallic plate, A⁴, in which are two series of upright slots, $a\ a$, extending across the casing-front, the slots of the upper series being situated over the spaces between the slots of the lower series, for a purpose to be described.

Attached to the inner sides of the ends or sides of the casing are the plates B B, forming supports for the mechanism of the apparatus. Attached to these plates at or near the rear side of the interior of the casing are the parallel transverse flat bars or plates C and C', the former being vertically below the latter and on a level just above the upper ends of the upper series of slots $a\ a$ in the front of the casing. Guided and sliding in a series of holes in these plates are the upright portions of rods D D, carrying on their upper ends, above the bar or plate C', the disks, plates, or tablets $d\ d$. The lower portions of the rods D D, below bar C, are bent forward at right angles, extending nearly to the front plate, A⁴, of the casing, where they are bent downward, and then forward again, so as to project out through the lower series of slots $a\ a$ in the plate. The ends of the rods in front of plate A⁴ are provided with plates $d'\ d'$, preferably made crescent-shaped, as shown, and inclined slightly backward. Similarly guided and sliding in a series of openings in the bars C C' are the upright portions of rods D' D', carrying on their upper ends the disks, plates, or tablets $d^2\ d^2$, and below the bar C bent forward at right angles and extending out through the slots of the upper series in the plate A⁴. The ends of the rods in front of the plate are provided with plates $d^3$, like those already described as being on rods D, and similarly arranged. The series of openings in the bars C C' through which rods D' D' reciprocate are in front of those through which rods D D move, and the openings of such front series are opposite the spaces between the openings of the other series. This makes the arrangement of the series of guide-openings in each of the plates C C' and that of two series of slots in plate A⁴ similar. The slot $a$ in which the forward end of each rod moves can then, as I prefer, be situated in the same vertical plane with the openings in bars C C' in which the upright tablet-carrying portion of such rod is guided.

Attached to each one of the rods D D', just in rear of plate A⁴, is a slide-plate, $d^4$, sliding over the inner or rear face of the plate as the rod is moved, and of such length as to keep the slot $a$ closed in all positions of the rod. The plates or tablets on the forward ends of the rods D D' are, as shown in the drawings, numbered to indicate different series from five cents up. The number of rods can be increased, as described, so as to increase the scope of possible indication to any desirable amount.

In the drawings the numbering of the key or movable rod-plate is shown as beginning at five cents and ending at one dollar; but I contemplate beginning with one cent and continuing the numbering to indicate any number of dollars. The number of movable rods or keys can be increased or diminished at will without departure from my invention. The tablet on the upper end of each rod is numbered on its front and rear side to correspond with the number on the key-plate on such rod, so that when any rod is pushed upward by pressure of the finger on its forward end the tablet of such rod will display through the glass-closed openings in the raised portion of the casing the number marked on its respective key-plate, and show clearly which key or rod has been operated. The horizontal portions of the rods D and D', extending forward from the lower ends of the upright portions of said rods, are, as shown in the drawings, in the same horizontal plane when down in their normal positions.

To hold up any one or more of the tablet-rods when it has been raised to display its tablet through the opening in the case, I provide the sliding slotted lock-bar E, extending across within the casing, preferably near the front thereof, and provided with the series of upright slots $e\ e$, through which the horizontal portions of rods D and D' pass. At one side of the lower end of each of these slots is an offset or notch, $e'$. At their upper ends the opposite sides of the slots $e\ e$ are inclined upward and inward at $e^2\ e^2$, so as to extend across and beyond the upright portions of the slots.

At the upper ends of the slots $e\ e$ and on the same side of the slots as the offsets or notches $e'\ e'$ are offsets or notches forming shoulders $e^3\ e^3$. The bar is held so as to be capable of reciprocation at right angles to the horizontal portions of key-rods D D' by lugs or rigid arms E' E', projecting from its ends and sliding in openings or bearings in the frame-plates B B or in brackets or arms attached to such plates. With this construction, if one of the indicating or key rods be raised to display its disk or tablet, the portion of the rod passing through the slot $e$ in the bar E comes in contact with the incline at $e^2$ at the upper end of the slot, and so causes the bar E to move endwise, so as to bring the shoulder $e^3$ under the rod in position to catch and hold it as raised. One of the guiding and supporting arms E' E' for the bar E is, as shown, extended outward through the case end, so that by pressing upon it the bar E can be reciprocated to carry the shoulder $e^3$ out from under the rod to release the latter. This projecting arm is preferably to be furnished with a knob, as shown in dotted lines in Fig. 4.

To draw the raised rod or rods down quickly when released by such movement of bar E, I provide the rod or bar F, resting on top of the horizontal portions of rods D D', and having at its opposite ends the arms $f\ f$, pivoted to the frame-plates B B. Connected with such rod or bar F by means of a wire or cord, $f'$, (see Figs. 3 and 5,) is the pivoted arm G, journaled on stud $g$, attached to the support G'. A spring, G², normally throws said arm downward, so as to draw the retracting-bar F down. As this bar extends entirely across the series of rods D D', it will be raised by the lifting of any one or more of such rods, and pressing upon them with the stress of the spring G² will throw any of them which are elevated down to their normal positions again.

Projecting from the journal-hub of the arm G is the rigid lug $g'$, which, as the arm is swung upward, engages and operates an alarm mechanism, so as to cause it to strike as the arm reaches the limit of its upward movement. With this construction, as any one of the keys or rods D D' is raised the bar F rises, raising the arm G, and the bell or alarm will be struck as the key or rod reaches the limit of its upward movement, and has slid the lock or stop bar E along so as to bring the locking shoulder thereon beneath itself.

The alarm mechanism which I prefer is shown best in Figs. 5 and 6, but I do not limit myself to the construction there shown. In such figures is shown the alarm-bell H and the spring-operated pivoted hammer H' therefor, having on its arm $h$ the pawl-pin $h'$, normally held projected into the path of the lug $g'$ on hub G' by means of the spring $h^2$. The upper side of the key $g'$ is beveled, its lower side being made flat or abrupt. As the arm G rises, the lug will with its lower side engage the pin $h'$, and so carry the hammer-arm $h$ downward until the pin passes off the end of the lug, when the hammer-spring causes the hammer to strike the bell. When, then, the arm G descends and the lug $g'$ rises, the bevel or incline on the upper side of the lug engages the pin and forces it outward, so that the lug can pass by it.

I contemplate having, besides the alarm just described for operation as a key-rod is fully raised, another alarm to operate just as a key-rod begins to be raised. For this purpose I provide a smaller bell, I, with its spring-actuated hammer I' adapted to be retracted, as the arm G begins to rise, by means of a pivoted dog, $i$, on the lug I², projecting from the hub of arm G. A stroke on this small bell will then be made whenever any of the key-rods D D' are raised at all at the beginning of a movement, and a stroke on the large bell when the raising of a rod is completed. The dog $i$ is pivoted or hinged at $i^3$ to lug $I^2$, so as to be rigid against pressure on its top, but to yield to pressure from below, and a spring, $i'$, is provided to keep it normally in position to strike and operate the tail of hammer I' as the lug rises. With the notches or offsets $e'$ $e'$ at the lower ends of slots $e$ $e$ in bar E, when one or more of the key-rods have been raised so as to move the bar to lock or hold them in their elevated position, such notches will lock the other rods from being raised. As soon as the bar is moved by pressure on the projecting arm E' to cause it to release the raised rods, the upright portions of the slots $e$ $e$ are again brought into line with the key-rods, so that they are free to be raised as desired. With this construction any number of the key or indicator rods can be raised simultaneously; but after one or more have been raised and locked by the bar E, another rod cannot be raised until the bar has been moved, as described, to release those already raised. The notches or offsets $e'$ $e'$ at the lower ends of slots $e$ $e$ serve to effectually lock all the rods down, when desired, if the bar E be moved to bring such notches over the rods. This can be done by drawing out the arm E', or, as I prefer, by having the bolt K of lock K' engage the inclined face $k$ on the end of one of the bar-supporting arms or lugs E' E' on the end of bar E opposite to that on which is the push-arm projecting through the case. When the bolt of the lock is thrown out in the ordinary manner by the key, it will engage the incline on arm E' (see Fig. 1) and force the bar E endwise to bring the rods D D' into engagement with notches $e'$ $e'$, and will hold and fasten the bar as so moved. The keys cannot then be operated. Upon the withdrawal of the bolt-lock the bar E can be pushed endwise in the opposite direction by means of the projecting arm E', so as to release the key-rods D D' again and leave them free to be moved. I contemplate, where desired, making the bar E as shown in Fig. 7—that is, with the tops or upper sides of the notches or offsets $e'$ $e'$ at the lower ends of slots $e$ $e$ inclined upward and inward to meet the sides of the slots. With this construction, when the bar is unlocked, if a key-rod be raised to indicate, it will, by engagement with the inclined upper side of the notch $e'$, automatically move the bar E so as to bring the slot $e$ directly over the rod, so that the latter is free to continue its upward motion. After one key-rod has been raised and locked in its elevated position, as already described hereinbefore, if another rod be raised it will, by engaging the upper inclined side of its notch, move the bar E in such direction as to release the rod already raised. If it be desired to indicate the same amount indicated by a rod already raised, the knob or button on the projecting arm E' is pressed, and the bar E is so moved thereby as to drop the rod ready for raising again. It will be observed that with both the forms of locking-bar described and shown no spring is used, and positive action is secured. The key-rods themselves as they are raised move the bar positively to lock and retain them.

As it is desirable to register the amounts indicated by the various movements of the separate key or indicator rods, I provide, above the respective rods, wheels L, journaled on a shaft, $K^2$, extending across within the casing near its front and fastened to or supported at its ends in the frame-plates B B. Each of these wheels has the portion L', (see Figs. 1 and 4,) with a plane peripheral surface, and the series of ratchet-teeth $l$ $l$, preferably twenty in number, at one side of such plane portion. To operate these wheels each rod D and D', just in rear of the slide-plate thereon, is provided with a spring-pawl, M, extending upward and engaging the ratchet-teeth $l$ on the wheel directly above the rod. As a key or indicator rod is raised, its pawl will engage a tooth on the respective wheel, turn the wheel a distance of one tooth, and then being pushed out of engagement with such tooth by the next tooth on the wheel will slide upward, as shown in dotted lines in Fig. 2, past the wheel, so as to allow the rod to rise sufficiently to display its numbered plate or tablet. Each wheel L is on its plane portion L' divided into twenty divisions, marked with numbers denoting successively greater multiples of the amount indicated by respective key or indicator rod. Such multiples run from once up to nineteen times said amount. The twentieth space is marked with a zero, and is the starting-point for the wheel.

Attached to a bar, M', extending across behind the series of wheels L L, are spring-pawls $m$ $m$, one for each wheel, adapted to engage the teeth thereof and prevent its turning backward.

For further continuing the registration of the sum of the amounts indicated by successive movements of the key-rods, I provide, journaled on rod N, the series of wheels O O, similar in shape and construction to wheels L L. There is one of the wheels O for each wheel L, and each wheel O has teeth $o$ $o$ projecting between wheels L L, of which teeth one is engaged by a pin, $l'$, on wheel L at each complete revolution of the latter. The plane surfaces of wheels O O are divided into divisions equal in number to the teeth, and such divisions on each wheel are marked with numbers indicating successively greater multiples of the amount represented by one complete revolution of the respective wheel L—that is, multiples of twenty times the amount marked on the tablet of the indicating-rod whose pawl operates such wheel L. The lowest number on each wheel O is twenty times the amount indicated on the respective rod-tablet. Attached to bar M', and extending upward, are the spring-pawls P P, one for each wheel O, having the bent or rounded portion $p$, adapted to engage the teeth on the wheel, so that as the wheel is being turned through one division such rounded or bent portion of the pawl will be forced back by a tooth on the wheel, and will then drop in between two teeth, as indicated in Fig. 2, and so not only hold the wheel from accidental turning, but insure its proper and complete turn through one division.

In front of the two series of wheels L L and O O is the shield R, provided with the two slots $R'$ $R^2$, through which can be seen the numbers on wheels L L and O O, respectively, the slots being so situated with relation to the wheels that as the latter are turned through one space or tooth the numbered divisions will come directly opposite the slots.

On the lower portion of the casing of my apparatus I provide a double cash-drawer, such as is shown in Figs. 8, 9, and 10. Such drawer is not shown in the other figures of the drawings, but it will be understood that it is to be situated in the casing just below the lower bank of indicator and register keys. To accommodate the drawer, the alarm mechanism of the apparatus can be moved or changed in position as desired. This double drawer consists of the lower portion, S, which can be made to slide directly within the casing, but is preferably made swinging by being pivoted on the forward ends of the swinging bars $S'$ $S'$ $S'$. These bars are connected at their forward ends by pins $s$ $ss$ to the bottom of the drawer—two near the front side thereof and one near its rear side. Such construction insures that the drawer will not tilt or rock as it is swung. Sliding on this drawer is the upper drawer, T, guided and held in place by a tongue or rib, $t$, at each side or end engaging or sliding in a groove, $t'$, in the side or end of the drawer S. The front side of drawer T extends down over and normally covers the front of drawer S, as shown in Fig. 9, and is provided with one or more knobs by which drawer T can be drawn out. Both drawers are normally locked together by the spring-catch $t^2$ on the drawer T engaging pin $t^3$ on the drawer S. When the drawer T is pulled out, the drawer S will then come out with it, and if it is desired to get at the contents of drawer S the drawer T is unlocked therefrom by raising the catch, and is slid forward, as shown in Fig. 8. The upper drawer is intended for small change and the lower one for bills or large change; but, obviously, the drawers can be used as desired.

The operation of my indicating and registering apparatus, as shown and described, is, briefly, as follows: When the apparatus is not in use, the bar E can be locked in such position by the lock-bolt K that all the key-rods will be engaged and held down by the notches $e'$ $e'$. When the apparatus is to be used, the bar is unlocked, and by pressing on the projecting arm $E'$ thereon is moved to disengage the rods from the notches. The key marked with the number or amount to be indicated is then pushed upward to display its indicating-tablet through the display-openings in the casing. By its engagement with the incline at the upper end of the slot $e$ in bar E the rod of such key moves the bar along, so as to bring the shoulder $e^3$ under itself to lock it as raised. The first upward movement of the key rings the starting or preliminary small alarm, and the last portion of such movement rings the larger alarm just as the key reaches the top of its travel, and moves the bar E to lock said key. During the upward movement of the key the pawl carried thereby engages a tooth on its respective wheel L, rotates the wheel through one space, and then slides upward past the wheel. The wheels L L and O O, operating as hereinbefore clearly described, keep certain account of the entire amount indicated by the various keys during the use of the apparatus—that is, the numbers on the wheels L L and O O which can be seen through the slots $R'$ $R^2$ upon raising the lid of the casing will show at once not merely the number of times that the respective key or indicator rods have been operated, but the amount marked on the indicating-tablets of the keys multiplied by the number of times that such keys have been operated. If, for instance, the twenty-five-cent key has been operated twenty-three times, the register-wheel L will show through slot $R'$ the number 75—that is, three times the amount indicated by the key and tablet—and the wheel O will show through slots $R^2$ the number 500, that being twenty times the amount indicated by the key each time it is moved. Of course, the register-wheels could, if desired, be numbered or figured so as to register merely the number of times that the respective keys had been operated, instead of the total amount indicated by the movements of the keys; but in reckoning up, the numbers shown by the wheels would have to be multiplied by the amount indicated by each key. I therefore prefer the wheels arranged and numbered as shown and described, so that the total amounts can be read off at once. When desired, the wheels can, upon opening the case, be readily set to zero again for a new registration. The wheels L L can be turned forward until the zero-marks thereon come opposite the slot $R'$, and the wheels O O can be turned forward or backward for the same purpose. When another indication and registration is to be made, the bar E is pushed endwise by pressure on the knob or arm E, and the raised key is dropped. Another key or the same one can then be raised to indicate and register a second amount of cash. Where the notches or offsets $e'$ $e'$, with inclined upper sides, are used, the next key can be raised at once without first moving bar E, for such key will itself move the bar to drop the raised key. If it is necessary to register and indicate the amount represented by one particular key several times in succession, such key can be dropped each time for the new registration by moving the bar E by arm E', as already described.

I do not claim or intend to cover by my claims sliding rods carrying indicating-disks and actuated by pivoted levers.

Having thus described my invention, what I claim is—

1. In a cash-indicator, in combination with the casing having a suitable display-opening, the series of movable indicating-keys consisting of the upright portions carrying the display plates or disks, and the portions made rigid with such upright portions, so as to move bodily therewith, and extending forward through openings in the front of the casing, substantially as and for the purpose specified.

2. In combination with the series of keys extending inward through slots in the casing, and having the upright portions within the casing made rigid with the inwardly-extending portions of the keys, so as to move bodily therewith, and carrying on their upper ends the indicating disks or plates, and suitable guides for such upright portions, substantially as and for the purpose shown.

3. In combination with the guide-bars, the rods guided in openings in such bars carrying indicating or display disks, and having the portions substantially at right angles to their guided portions made rigid with such latter portions, so as to move bodily therewith, adapted to act as keys, whereby the rods can be moved, substantially as and for the purpose set forth.

4. In combination with the casing provided with a display-opening, the series of upright rods within the casing carrying on their upper ends indicating or display disks or plates, and having the rigid forwardly-extending arms projecting through slots in the casing-front and provided with plates marked to correspond with the display-disk, substantially as and for the purpose described.

5. In combination with the casing provided with a suitable display-opening, the guide-bars, the series of rods having upright portions guided in openings in such bars and bearing on their upper ends marked indicating-plates, and the forwardly-extending portions projecting through openings in the casing-front and provided with plates numbered or marked to agree with the marks on the respective indicating-plates, substantially as and for the purpose specified.

6. In combination with the casing provided with a series of slots in its front, the series of indicating-keys, each formed of an upright portion carrying the display or indicating plate, and the portion at right angles to such upright portion extending through a slot in the casing-front and provided with a marked key-plate, and the plates on the keys adapted to close the slots in the casing, substantially as and for the purpose shown.

7. In combination with the series of rods having the upright reciprocating portions carrying the indicator-disks, and the horizontal portions to act as keys, whereby the rods can be moved, a bar resting against and engaging such horizontal portions, and a spring connected with such bar, so as to draw it downward, substantially as and for the purpose set forth.

8. In combination with the series of rods having the reciprocating portions carrying the indicator-disks and the portions substantially at right angles thereto, the bar engaging such latter portions of the rods, a swinging arm connected with the bar, and a spring for actuating the arm, substantially as and for the purpose described.

9. In combination with the indicator-rods having the upright tablet-carrying portions and the horizontal key portions, the bar resting on the latter portions of the rods and having arms at its ends pivoted to suitable supports, and a spring suitably connected with such bar to draw it downward, substantially as and for the purpose specified.

10. In combination with the horizontal forwardly-extending portions of the indicator-rods, the bar resting thereon, spring mechanism for drawing the bar downward, and an alarm mechanism connected with the bar, so as to be operated as the latter is raised, substantially as and for the purpose shown.

11. In combination with the keys, the bar engaging all the keys, so as to be lifted by the raising of any one of them, an alarm mechanism connected with the bar, so as to be operated as the bar begins to rise, and a second alarm adapted to be operated as the upward movement of the bar is completed, substantially as and for the purpose set forth.

12. In combination with the series of keys, the bar engaging the series of keys, so as to be actuated by any one of them, the two alarm mechanisms, and connecting means between them and the bar whereby one is caused to give an alarm as a key begins to move and the other to give a second alarm as the key completes its movement, substantially as and for the purpose described.

13. In combination with the keys, the bar engaging all the keys, the swinging arm connected with the bar, the spring for actuating the arm, the two alarm devices, and means connected with the arm whereby one of the devices is operated as the arm begins to move and the other is actuated as the arm completes its swing, substantially as and for the purpose specified.

14. In combination with the series of keys, the bar moving at right angles to such keys and provided with retaining-shoulders adapted to be brought under any elevated keys by the longitudinal movement of the bar, and means whereby as a key is raised it automatically moves the bar to bring the respective retaining-shoulder thereon below it, substantially as and for the purpose shown.

15. In combination with the series of keys, the longitudinally-moving bar provided with the series of upright slots, through which the keys pass, and having at one side of the lower ends of such slots offsets or notches, substantially as and for the purpose set forth.

16. In combination with the series of keys, the bar extending across such series, having the upright slots, through which the keys pass, provided at their upper ends with inclines, and with shoulders below the upper ends of such inclines, substantially as and for the purpose described.

17. In combination with the series of keys, the movable locking-bar provided with the upright slots, and having at the upper ends of each of such slots an incline on one side and a notch or shoulder on the other, and at the lower end of the slot an offset or notch on the same side as the upper notch or shoulder, substantially as and for the purpose specified.

18. In combination with a movable key, a movable piece having a slot, in which the key moves and at one end of the slot, a notch at one side thereof, and at the other a notch and an opposite incline, substantially as and for the purpose shown.

19. In combination with the casing and series of keys, the slotted movable bar having at one end of each slot an incline on one side and a notch or offset on the other, and means whereby the bar can be moved from outside the casing, substantially as and for the purpose set forth.

20. In combination with the casing and the series of keys, the movable slotted bar having a slot for each key to play in, and a notch or offset at one side of each slot, the lock having its bolt adapted to hold the bar moved so as to bring the notches or offsets therein into engagement with the keys, substantially as and for the purpose described.

21. In combination with the series of keys and the movable locking-bar for locking the same, the lock, and a lug or arm on the bar having an incline adapted to be engaged by the bolt of the lock, so as to move said bar longitudinally to lock the keys and hold it so, substantially as and for the purpose specified.

22. In combination with the indicator-rods having the upright portions carrying the indicating disks or tablets and the horizontal portions by which the rods are raised, the spring-pawls M M, formed of spring-plates rigidly attached to such latter portions, the series of register-wheels engaged and operated by such pawls as the keys are raised, and the second series of register-wheels operated from the other wheels at each complete turn of the latter, substantially as and for the purpose shown.

In testimony that I claim the foregoing I have hereunto set my hand this 19th day of March, A. D. 1886.

CABEL B. HOPKINS.

Witnesses:
HENRY C. HAZARD,
WILLIAM FITCH.